Oct. 7, 1952     C. D. CHRISTIE     2,612,965
ENGINE GOVERNOR CONTROL MEANS
Filed Nov. 13, 1947     2 SHEETS—SHEET 1
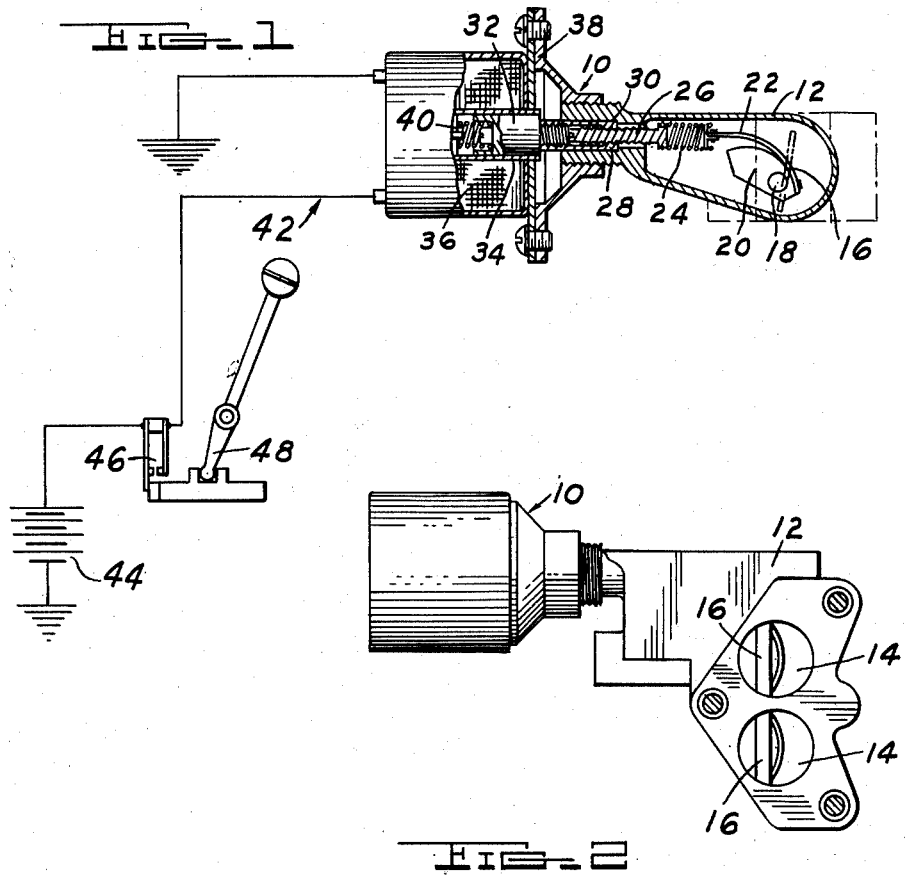
INVENTOR.
CHESTER D. CHRISTIE
BY
McDonald & Teagno
ATTORNEYS Oct. 7, 1952 — C. D. CHRISTIE — 2,612,965
ENGINE GOVERNOR CONTROL MEANS
Filed Nov. 13, 1947 — 2 SHEETS—SHEET 2
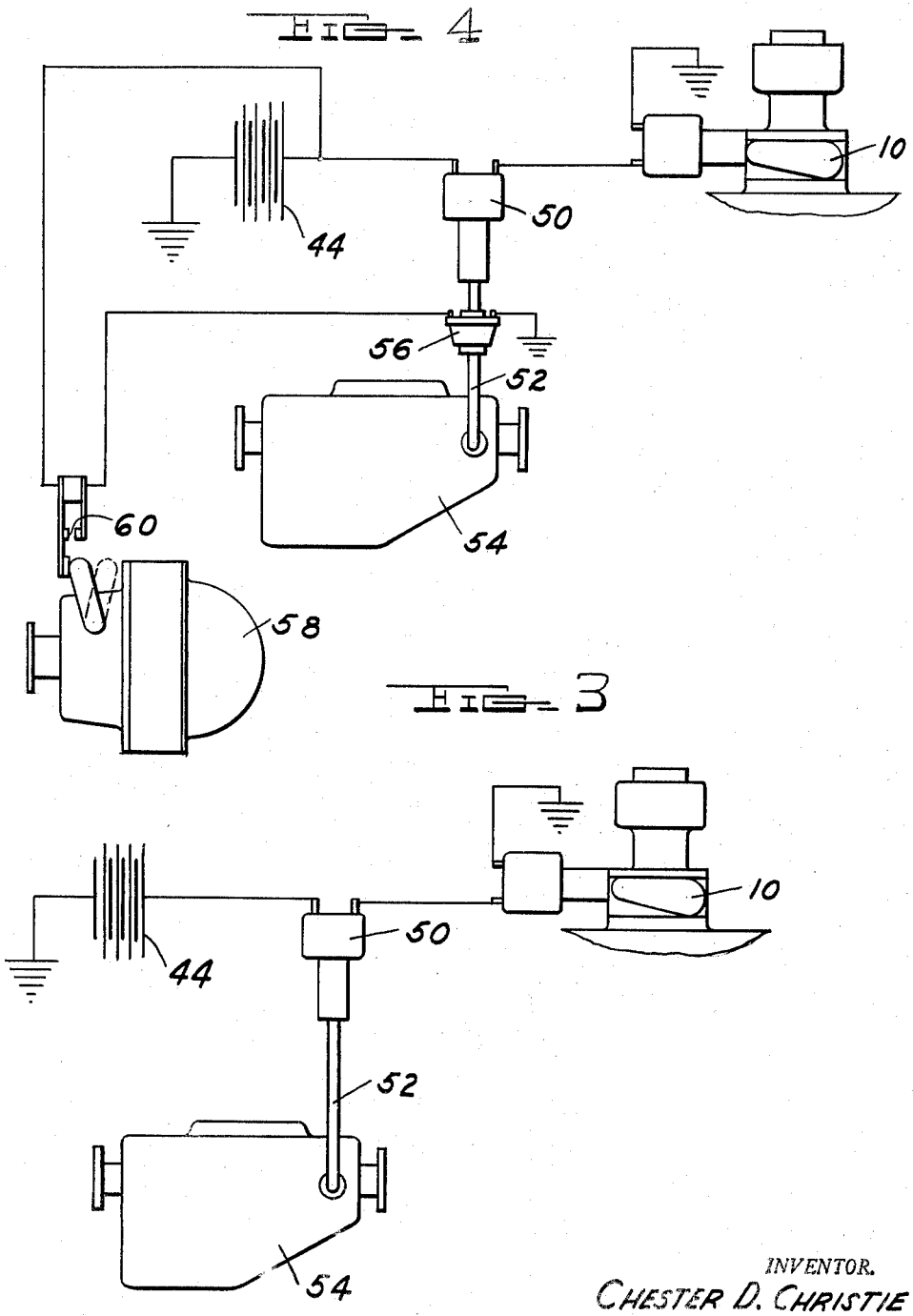
INVENTOR.
CHESTER D. CHRISTIE
BY
McDonald & Fragno
ATTORNEYS Patented Oct. 7, 1952

2,612,965

UNITED STATES PATENT OFFICE 2,612,965

ENGINE GOVERNOR CONTROL MEANS

Chester D. Christie, South Euclid, Ohio, assignor to Eaton Manufacturing Company, Cleveland, Ohio, a corporation of Ohio Application November 13, 1947, Serial No. 785,658

2 Claims. (Cl. 180—82.1)

This invention relates to internal combustion engines and more particularly to engine speed governor control thereof.

Broadly the invention comprehends the provision of a speed control governor for internal combustion engines that is automatically regulated to predetermined desired vehicle speed ranges or vehicle drive gear setting.

Although engine control governors have been extensively employed on internal combustion engines none has been devised that can be automatically regulated to allow for control of engine R. P. M. for maximum H. P. for one condition of operation of the associated vehicle and at the same time provide for control of another range of engine R. P. M. for a different condition of operation of the vehicle. The present invention through the automatically controlled operation of an electrically operated solenoid associated with the normal adjusting means of a conventional type of governor provides for the regulation of the governor to predetermined desired operating conditions of the engine.

An object of the invention is the provision of an engine speed governor in association with an internal combustion engine that is automatically responsive and regulatable relative to vehicle speed for limiting the engine R. P. M. for different conditions of operation of the vehicle.

Another object of the invention is the provision of an engine speed governor in association with an engine that is regulatable for different settings of engine R. P. M. in accordance with gear ratio changes of gear mechanism associated with the engine.

A further object of the invention is the provision of a governor for regulating the operating speed of an automotive vehicle engine for different conditions of vehicle operation, said governor being automatically for different settings in response to solenoid mechanism associated therewith, said solenoid mechanism in turn being controlled by automotive speed controlled gear shifting mechanism associated in the electrical circuit for the solenoid.

A yet further object of the invention is the provision of an automotive vehicle engine equipped with a speed control governor, said governor being normally set for a predetermined engine R. P. M. operation and having means associated therewith under the control of the vehicle speed or gear setting thereof for changing the governor setting for a different predetermined engine R. P. M. operation.

A still further object of the invention is the provision of an automotive vehicle engine equipped with a speed control governor permitting of the automatic proper controlled operation of the engine from a predetermined setting so as to be free from vehicle operator molestation or change once the setting is made.

Other objects and advantages of the invention will appear from the following description taken in connection with the drawings, forming a part of the specification; and in which:

Fig. 1 is a partially cross-sectionalized view of a regulated engine speed governor in association with a diagrammatically illustrated electrical control means therefor;

Fig. 2 is a top plan view of the regulated engine speed governor;

Fig. 3 is a further modified electrical controlling system for the governor of Figs. 1 and 2 and;

Fig. 4 is a yet further modified electrical controlling system for the governor of Figs. 1 and 2.

The presently devised regulatable engine speed governor is intended for use in overcoming objectionable conditions prevalent relative to the conventional type of governor employed by engine driven automotive vehicle.

It is the general case in the use of conventional engine speed control governors, that the engine manufacturer usually recommends that the maximum engine R. P. M. should not exceed the speed required for maximum H. P. output with the result that in setting the governor for the recommended maximum engine speed operation for peak H. P. in low gear the road speed in high gear is excessive. As an example if in the case of an engine rated to give maximum H. P. at 3200 R. P. M. the conventional type of speed governor employed is set for this operation, which is desirable, it must be accepted that in high gear the vehicle can reach a speed of say 57 M. P. H. whereas on the other hand if it is of greater importance that the maximum vehicle speed be limited to 45 M. P. H. then the engine speed must be held down to 2500. Therefore with the governor set to control the maximum allowable road speed of the vehicle the low gear driving condition thereof will necessarily suffer because the engine will be operating 700 R. P. M. under peak performance conditions.

These conditions of operation can be circumvented through the provision of an engine speed governor that can be regulated to varying conditions of vehicle operation such that for say high speed gear operation of an engine driven vehicle the governor is initially adjusted for maximum road speed and for low gear operation, through the function of the solenoid, changeable to control maximum R. P. M. for peak H. P.

The present governor is adapted to be automatically controlled or regulated through the provision of an electrically operated solenoid for altering the spring tension on the throttle plate of the governor. The electrical circuit for the solenoid is adapted to be associated with appropriate make and break means adapted to be actuated by mechanism associated with gear changing or drive transmitting means associated with the vehicle of which the governor controlled engine forms a part.

There are several conditions of operation of a vehicle embodying a governor controlled engine where it is desirable to regulate the governor setting for controlled R. P. M. operation of the engine and accordingly the presently devised governor is adapted to be changed from its initial setting to another desired setting in accordance with vehicle speed change gear shifting or predetermined speed of a drive transmitting member of the governor. The ultimate condition of operation obtained is that the governor is actuated from an initial adjusted engine speed control for one desired phase of operation of the vehicle to another engine speed control position for another desired phase of operation of the vehicle.

Referring to the drawings for more specific details of the invention 10 represents generally an engine speed control governor adapted to be interposed between the carburetor and engine manifold of an engine, not shown.

The governor 10 comprises a governor body 12 having a pair of orifices 14 there adapted to match comparable orifices of a carburetor, not shown for the passage of fuel mixture.

A pair of throttle plates 16, one for controlling the passage of fuel mixture through each orifice, are mounted upon a shaft 18 journalled in the governor body. A cam member 20 is fixedly secured upon the shaft 18 and has attached at one end thereto a leaf spring 22 which in turn is secured at its free end to a coil spring 24. The coil spring is secured at its other end to an adjusting screw 26 which is received in threaded engagement by a threaded sleeve 28 slidably reciprocable in a bore 30 in the body of the governor. The sleeve 28 has secured in one end thereof oppositely disposed from screw 26 a solenoid plunger 32 which is mounted for reciprocable movement in a bore 34 of a conventional type of solenoid 36.

The solenoid 36 is suitably secured with relation to the governor body by an intermediate housing member 38 threaded upon the governor body between the governor proper and solenoid.

The adjusting screw 26 provides for initial regulation of a spring tension on the throttle plates 16 for controlling the maximum flow of fuel mixture to the intake manifold of the engine from the carburetor and thus controls the engine for a predetermined desired high gear maximum road speed operation.

This initial adjustment places the coil spring under a relatively light tension and therefore a relatively low flow of fuel mixture will tend to effect a closure of the throttle plates 16.

An adjustable air gap 40 is provided between the solenoid plunger and armature of the solenoid and can be controlled for desired motion of the solenoid plunger by threading the housing member 38 the desired distance upon the governor body.

The air gap 40 is adjusted relative to desired solenoid plunger movement as predetermined for a desired condition of operation of the vehicle such that with the solenoid in operation the plunger places the coil spring under a relatively heavy tension and therefor a relatively high flow of fuel mixture is necessary to effect a closure of the throttle plates as compared to the low flow required for closure under the initial light setting of the spring tension on the throttle plates.

As shown by Fig. 1 the solenoid is arranged in an electrical circuit 42 which includes a storage battery 44 as a source of electrical power and a make and break switch 46 controlled as by a gear shifting mechanism 48 associated therewith. The gear shift 48 is of the two position variety and as shown by the drawings is in high gear vehicle transmission operation. With the shift 48 in high the governor is set for maximum engine operation for controlled maximum speed of a vehicle with which the governor controlled engine and gear shifting mechanism is to be associated.

With the air gap 40 set for predetermined regulation of the governor for a low gear operation of gear shift mechanism 48, the associated vehicle in low gear driving condition can be operated at maximum engine R. P. M. for maximum H. P. thus permitting peak engine performance.

The solenoid-governor as shown by Figs. 1 and 2 is also adapted for use when it is desired to control the same relative to the predetermined speed operation of a specific related driving member of an associated vehicle and is so illustrated by Fig. 3 wherein the electrical control circuit for the solenoid operation includes a conventional speed responsive switch 50 controlled as by a driven member 52 coupled to a driven member not shown of a vehicle transmission 54. The switch 50 is so set relative to the governor and solenoid regulation that upon predetermined speed of attainment of member 52 as governed by the transmission speed is actuated to open position to break the electrical circuit and disengage the solenoid from actuation. With the disengagement of solenoid operation and movement of the governor to its initial setting all high speeds of operation with a predetermined limit will be controlled through the governor as it so effects the engine R. P. M. operation.

The control system of Fig. 4 is an amplification of that shown by Fig. 3 through the addition of an electromagnetic change speed adapter 56 arranged in driving connection with the driven member 52 controlled as by the vehicle operator's actuation of two speed axle gearing 58 having a make and break switch 60 thereof arranged in the circuit. The speed responsive switch 50 shown in Fig. 4 is adapted to operate similarly with that shown in circuit in Fig. 3 for control of the governor operation but the input speed to the switch varies in accordance with the axle operation as it effects changes in the speed adapter connected with member 52. As such the switch 50 is effected directly by the speed of the transmission and switch as controlled by the speed change adapter.

While this invention has been described in connection with certain specific embodiments, the principle involved is susceptible of numerous other applications that will readily occur to persons skilled in the art. This invention is, therefore limited only as indicated by the scope of the appended claims.

What I claim is:

1. In combination with an automotive vehicle, an engine therefor, a transmission driven from the engine, a multiple speed axle driven from the transmission, a speed control governor for the engine comprising a housing, an orifice therethrough, and a tension adjustable resiliently loaded throttle valve controlling the orifice, electromagnetically actuated means for changing the normal tension setting of the governor throttle valve, a power supplied electrical circuit having the electromagnetically actuated means as a part thereof, a speed controlled switch in the circuit responsive to transmission speeds, a speed change adapter drivingly connected between the transmission and switch, and a second switch in the circuit responsive to shifting of the axle ratios for actuating the speed change adapter.

2. In combination with a vehicle, an engine therefor, a speed change transmission driven therefrom, a velocity type engine speed control governor comprising a housing interposed between the carburetor and the intake manifold of the engine having an orifice therethrough communicating on opposite ends thereof with the carburetor and manifold, a throttle plate pivotally mounted on the housing in the orifice for controlling fluid flow therethrough, adjustable spring tension means for predeterminedly tensioning the throttle plate including a coil spring interconnected to the throttle plate on one axial extremity thereof, and an adjustable screw connected to the other opposite axial extremity of the spring, a solenoid comprising an electromagnetic coil and an armature cooperable therewith, said armature being threadingly coupled to the adjustable screw whereby the screw is axially adjustable relative to the armature for varying the fixed spring load on the throttle plate and the screw and spring are axially movable in unison upon actuation of the armature, a source of electrical current for the coil, and speed controlled switch means actuated by the output speed of rotation of the transmission for controlling the supply of current to the coil.

CHESTER D. CHRISTIE.

REFERENCES CITED

The following references are of record in the file of this patent:

UNITED STATES PATENTS

| Number | Name | Date |
| --- | --- | --- |
| 1,843,960 | Sticelber | Feb. 9, 1932 |
| 2,130,088 | Howard | Sept. 13, 1938 |
| 2,170,744 | Adler | Aug. 22, 1939 |
| 2,193,224 | Cowles | Mar. 12, 1940 |
| 2,225,206 | Cassels | Dec. 17, 1940 |
| 2,236,669 | Breer et al. | Apr. 1, 1941 |
| 2,242,832 | Mennesson | May 20, 1941 |
| 2,350,431 | Vatter | June 6, 1944 |